United States Patent [19]

Bastian et al.

[11] 4,392,140
[45] Jul. 5, 1983

[54] DUAL CABLE DRIVE ROLLING ARC GIMBAL

[75] Inventors: Thomas W. Bastian, Fullerton; John M. Speicher, Upland, both of Calif.

[73] Assignee: General Dynamics, Pomona Division, Pomona, Calif.

[21] Appl. No.: 285,169

[22] Filed: Jul. 20, 1981

[51] Int. Cl.³ .............................................. H01Q 3/08
[52] U.S. Cl. .................................... 343/765; 343/766; 74/1 R
[58] Field of Search ............. 343/765, 766; 74/501 R, 74/501 P, 470, 484 R, 486, 1 R

[56] References Cited
U.S. PATENT DOCUMENTS 4,238,802  12/1980  Speicher .............................. 343/765
4,282,529   8/1981  Speicher .............................. 343/765

*Primary Examiner*—David K. Moore
*Attorney, Agent, or Firm*—Neil F. Martin; Freling E. Baker; Edward B. Johnson

[57] ABSTRACT

A gimbal assembly includes an outer arcuate yoke gimbal member mounted on rollers to rotate about its axis and an inner gimbal member includes a platform pivotally mounted in the yoke to rotate about a second axis. Two drive motors are separately and independently connected through independent cable drive assemblies to separate ones of the inner and outer gimbal members and functions either individually or together to rotate the gimbal members selectively or both together in a combination of motion. In one form, the two drive motors are co-axially mounted in the base of the gimbal assembly. In another form the gimbal drive motors are co-axially mounted with the outer housing of one motor forming the drive pulley for the other drive assembly. In another arrangement the motors are disposed on adjacent parallel axes with one drive motor for the inner gimbal having co-axially disposed drive pulleys for the drive cable.

9 Claims, 6 Drawing Figures

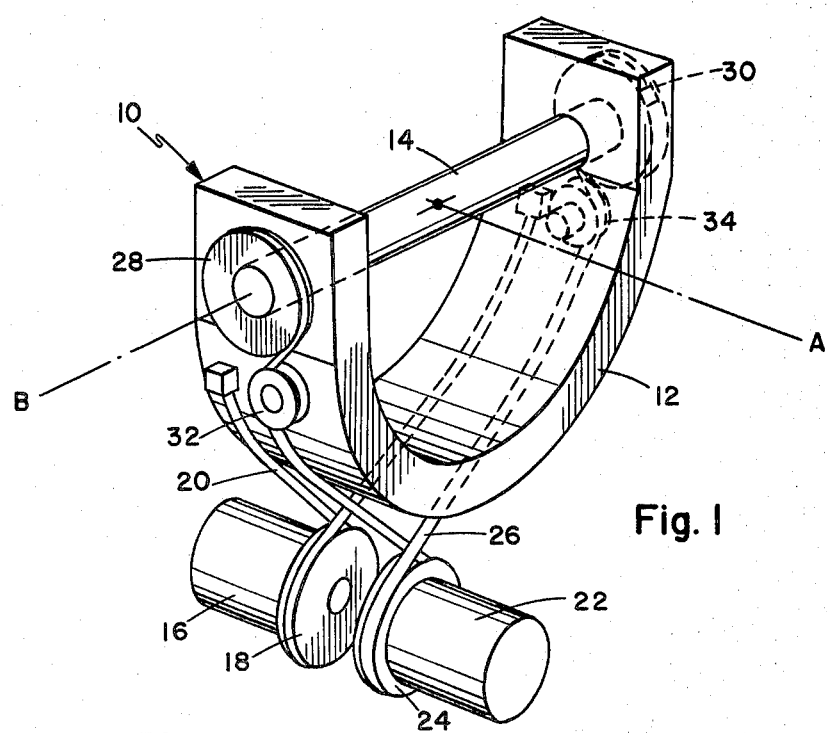
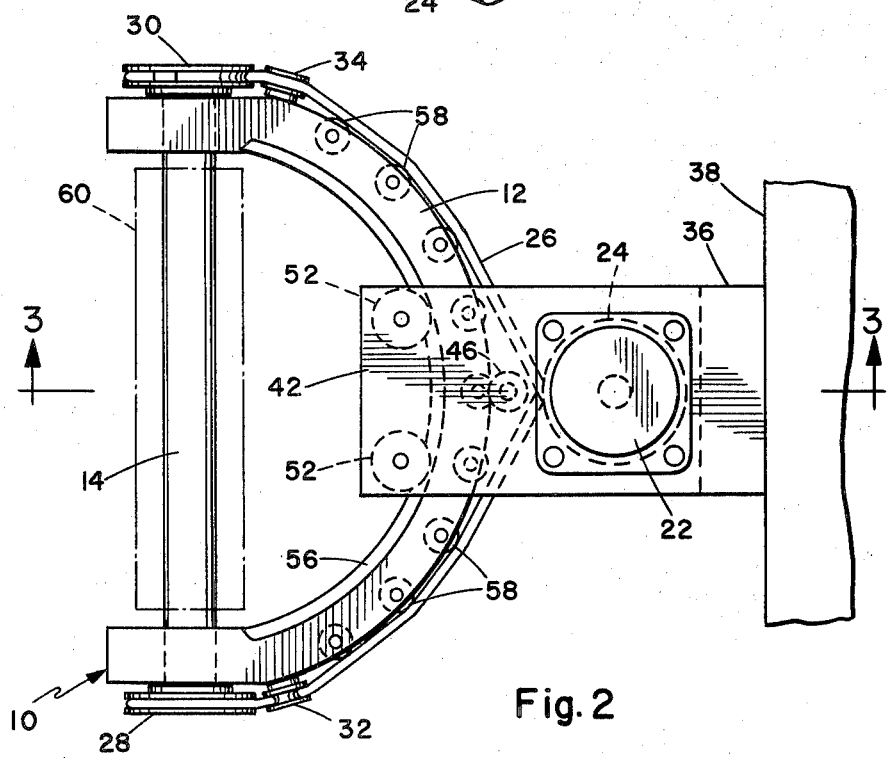
Fig. 1
Fig. 2

DUAL CABLE DRIVE ROLLING ARC GIMBAL

BACKGROUND OF THE INVENTION

The present invention relates to gimbal mounts and pertains particularly to a rolling arc gimbal mount.

Aircraft, both manned and unmanned, utilizes information sensing and receiving devices such as antennas and the like for receiving and transmitting information for guidance control and other functions. Because weight and space is a premium on such vehicles, it is desirable that the mechanisms and instrumentation be as compact and lightweight as possible. It is also desirable that the mass of moving parts be kept to a minimum in order to reduce control complications and other problems.

One approach to the reduction of the mass of moving parts in gimbal assemblies for seeker heads and the like are shown in U.S. Pat. No. 4,238,802 issued to Speicher on Dec. 9, 1980, and entitled "Differential Drive Rolling Arc Gimbal".

That patent discloses a arrangement wherein the drive motors are mounted on the base of the gimbal structure and differential cable drive means interconnects the gimbal members. The present invention employs an alternate drive arrangement which is somewhat simplified in comparison to that of the above patent.

SUMMARY AND OBJECTS OF THE INVENTION

It is the primary object of the present invention to provide an improved gimbal mounting and drive assembly.

In accordance with the primary aspect of the present invention, a roller arc type gimbal assembly includes first and second drive motors mounted in the base with separate cable drives interconnecting the respective motors with a separate one of the gimbal members for controlled, separate and combined drive of the gimbal assembly.

BRIEF DESCRIPTION OF THE DRAWINGS

The above and other objects and advantages of the present invention will become apparent from the following description when read in conjunction with the drawings wherein:

FIG. 1 is a perspective view of a gimbal yoke illustrating the basic multiple cable drive.

FIG. 2 is a side elevation view of a gimbal mounting incorporating the drive.

DETAILED DESCRIPTION OF PREFERRED EMBODIMENTS

Figure 3:
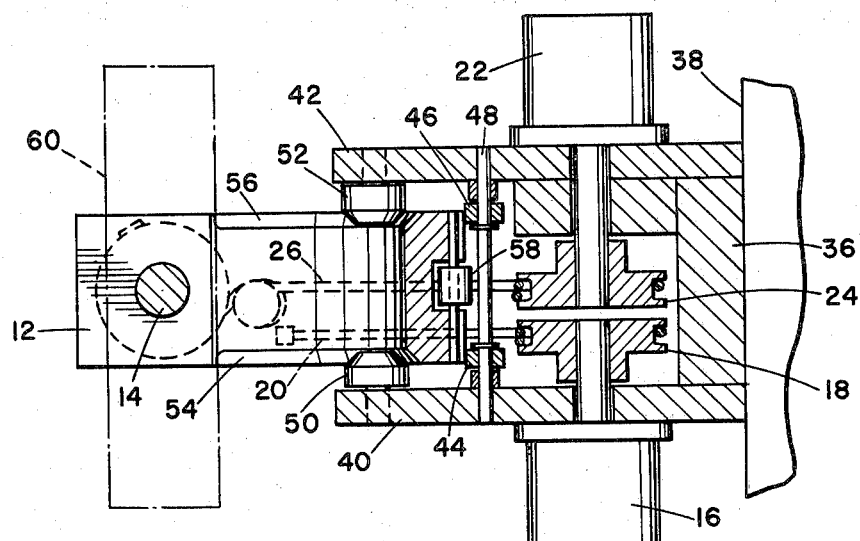
FIG. 3 is a sectional view taken on line 3—3 of FIG. 2.

Turning to FIG. 1 of the drawings, an overall rolling arc gimbal and drive assembly generally designated by the numeral 10, is shown including an outer arcuate shaped arc gimbal yoke 12 mounted for rotation about its axis A and an inner gimbal mounting shaft 14 journaled within the yoke 12 for rotation about its axis B which is at substantially 90° to the axis A.

The drive arrangement, or assembly, includes a first drive motor 16 drivingly connected by means of a drive pulley 18 and a cable 20 wound around the pulley for driving the arcuately shaped yoke member 12 about its rotational axis. The cable 20 is fixed at its ends directly to the yoke 12 on opposite sides thereof.

A second drive motor 22 is drivingly connected by means of a pulley 24 and a flexible drive cable 26 to platform drive pulleys 28 and 30 secured to the ends of the inner gimbal shaft 14. Idler guide pulleys 32 and 34 guide and position the cable for alignment, and extends the arcuate range of engagement of the pulley with drive pulley 24 and extends the arcuate range of engagement of the cable with the platform drive pulleys 28 and 30. The ends of the cable trail around the pulleys 28 and 30 and are fixed at a position to enable the desired amount of rotation of the shaft 14 in the alternate direction about its axis.

The mounting of the gimbals and motors is best illustrated in FIGS. 2 and 3 wherein a mounting base 36 is secured to a supporting structure 38 such as an airframe or the like. The mounting base 36 includes a pair of upstanding side members or brackets 40 and 42 on which the drive motors 16 and 22 are mounted. These motors may be co-axially mounted if desired to provide a more compact arrangement.

The arcuate yoke member 12 is mounted between the bracket members 40 and 42 on support rollers 44 and 46 rotatably mounted on a shaft 48. The outer surface of the upper yoke member 12 engages and is supported by the rollers 44 and 46. Pairs of thrust rollers 50 and 52 having conical bearing surfaces engage beveled bearing surfaces 54 and 56 on the inner diameter of the arcuate yoke member 12. This retains the yoke member securely in position between the mounting rollers and permits rotation of the yoke member to rotate about its rotational axis. A plurality of support rollers 58 are rotatably mounted on the yoke member 12 and extend outward from the outer surface thereof for supporting the cable 26 and reduce the friction thereon during rotation of the inner gimbal. An inner gimbal platform 60 is shown in phantom supported on the shaft 14.

In operation, the drive motors may be operated in various combinations of either individually or together to obtain the desired motion. To visualize the inner gimbal motion, for example, using FIG. 1 assume that the outer gimbal 12 is held stationary and motor 22 is driven in the clock-wise direction resulting in the left side portion of cable 26 being pulled over drive pulley 24 thus also pulling it off of pulley 28 rotating the shaft 14 in the clock-wise direction as viewed in FIG. 1. Simultaneously, the right hand portion of cable 26 is being wound onto the pulley 30.

In order to move the outer gimbal only, both inner and outer motors 22 and 16 must be driven in the same direction. The relative speed of the two motors depends on geometry and dimensions.

In order to achieve combined plane motion, motor 16 must be controlled for the desired motion or yoke 12, while motor 22 must add displacement due to outer yoke motion to the desired inner gimbal displacement.

Figure 4:
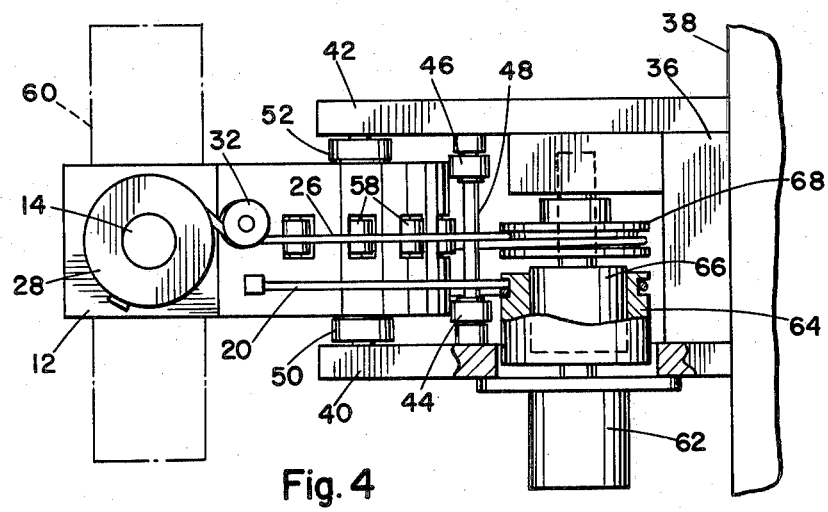
FIG. 4 is a top plan view of a gimbal mounting, with portions cut away to show an alternative drive motor arrangement.

Turning to FIG. 4, an alternate embodiment is illustrated wherein identical elements are identified by the identical reference numerals. The drive motor arrangement is slightly different with an outer gimbal drive motor 62 mounted directly to the bracket 40 and having the drive pulley 64 that is also the housing for the inner gimbal drive motor 66. The pulley 64 drives the cable 20 for rotation of the outer gimbal. The inner gimbal drive motor 66 includes a drive pulley 68 which is drivingly connected for driving the inner gimbal drive cable 26. This embodiment provides a drive arrangement wherein motor displacement is directly equivalent to single place gimbal displacement. In other words, displacement of the outer gimbal drive motor with the inner motor locked results in pure outer gimbal motion and vice-versa. Both pulleys, however, should have the same diameter for this result. As will be appreciated the input of the motors is automatically added with the necessity of establishing an appropriate drive relationship for certain gimbal motions.

Figure 5:
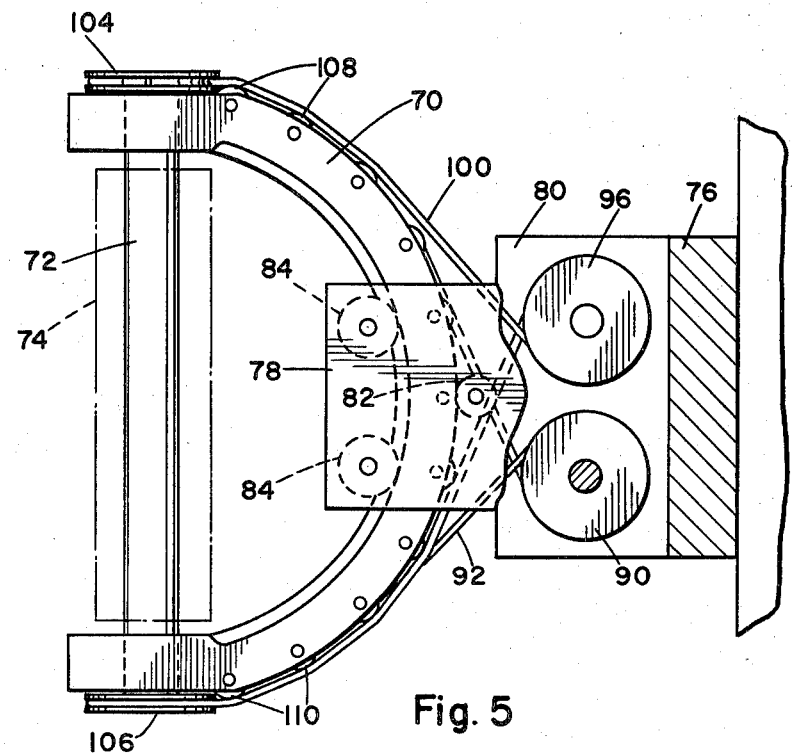
FIG. 5 is a side elevation view of an alternative gimbal mounting with a 3 cable drive.
Figure 6:
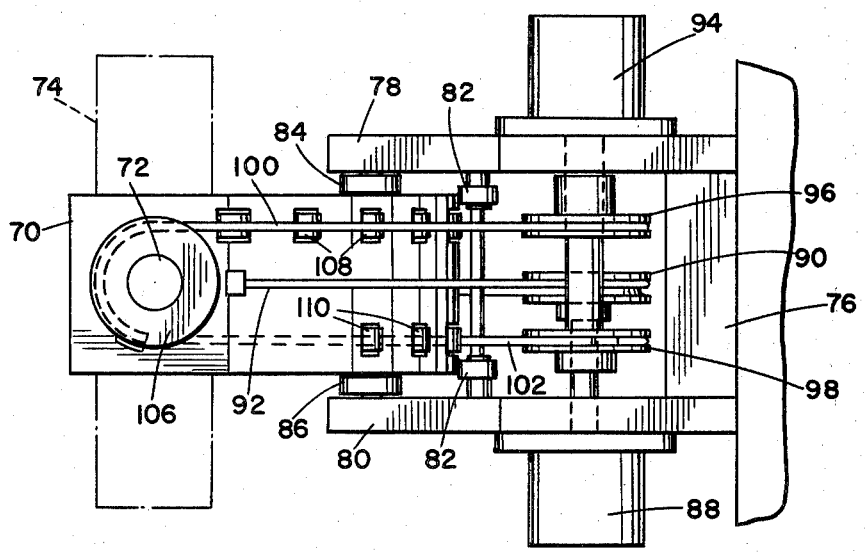
FIG. 6 is a top plan view of the structure of FIG. 5.

Turning now to FIGS. 5 and 6, an alternate embodiment is illustrated wherein an outer arcuate gimbal member 70 includes an inner gimbal mounting shaft 72 and inner gimbal platform 74. The outer gimbal 70 is rotatably mounted in a base member 76 having parallel side supports or bracket member 78 and 80 with rollers 82 engaging the outer surface of the arcuate gimbal members and rollers 84 and 86 engaging the inner diameter of the ring member. Outer gimbal drive motor 88 is drivingly connected by means of a pulley member 90 and cable 92 for driving the outer gimbal member 70 about its axis.

Offset to one side and parallel to the motor 88 is a second drive motor 94 having a drive connection by means of a pair of drive pulleys 96 and 98 by way of cables 100 and 102 with the drive pulleys 104 and 106 on opposite ends of the inner gimbal shaft 72. One set of rollers 108 on one side of the gimbal member 70 support the cable member 100, with a second set of rollers 110 on the opposite side of the gimbal member supporting the cable 102. The inner gimbal drive cable is thus divided into two halves, 100 and 102, with each having an end anchored to one of the inner gimbal platform pulleys 104 and 106 and the other end attached to one of the two inner gimbal drive motor pulleys 96 and 98. This arrangement eliminates the need for the idler pulleys on the arcuate member frame for positioning the drive cables.

While we have illustrated and described our invention by means of specific embodiments, it is to be understood that numerous changes and modifications may be made therein without departing from the spirit and scope of the invention as defined in the appended claims.

Having defined our invention, we now claim:

1. A cable drive rolling arc gimbal, comprising:
   a base having means for attachment to a supporting structure;
   an arcuate, substantially semicircular yoke supported in said base for rotation about its axis;
   a platform having a supporting shaft pivotally mounted in said yoke for rotation about an axis substantially orthogonal to the axis of rotation of the yoke;
   a yoke drive motor and a platform drive motor mounted on said base and separate yoke and platform cable drive means separately connecting each of said motors to a separate one of said yoke and said platform;
   said platform cable drive means includes a cable connected at opposite ends to separate drive pulleys mounted on opposite ends of said platform supporting shaft; and
   said platform drive motor is drivingly connected to said cable by means of a pulley intermediate to the ends of the cable.

2. The rolling arc gimbal assembly of claim 1 wherein said first and second drive motors are co-axially mounted.

3. The rolling arc assembly of claim 1 or 3 wherein said platform drive means includes a pair of guide pulleys disposed adjacent said platform drive pulleys for guiding said platform drive cable on said yoke.

4. The rolling arc gimbal assembly of claim 3 wherein said platform drive cable is supported on rollers on said yoke.

5. The gimbal assembly of claims 1 or 2 wherein the platform drive motor includes an outer housing which is driven by the yoke drive motor.

6. The gimbal assembly of claim 5 wherein the yoke drive pulley is integral with and rotates with the outer housing of said platform drive motor.

7. The gimbal drive assembly of claims 1 wherein said yoke drive motor and said platform drive motors are offset on parallel drive axes.

8. The drive assembly of claim 7 wherein said platform drive motor includes separate cable drive pulleys; and
   a separate drive cable for each platform drive pulley.

9. The drive assembly of claim 8 wherein said platform drive cables are disposed on opposite sides of the center of said arcuate yoke.

* * * * *